United States Patent
Qiu et al.

(10) Patent No.: US 7,288,619 B2
(45) Date of Patent: Oct. 30, 2007

(54) FLUORINATED POLYETHER POLYAMINE AND METHOD OF MAKING THE SAME

(75) Inventors: Zai-Ming Qiu, Woodbury, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 357 days.

(21) Appl. No.: 10/840,969

(22) Filed: May 7, 2004

(65) Prior Publication Data

US 2005/0250928 A1 Nov. 10, 2005

(51) Int. Cl.
C07C 211/00 (2006.01)
C07C 233/00 (2006.01)

(52) U.S. Cl. ............ 528/329.1; 524/538; 525/418; 528/342; 528/361; 528/363; 528/401; 564/123; 564/133; 564/134; 564/138; 564/142

(58) Field of Classification Search ............ 528/329.1, 528/342, 361, 363, 401; 525/418; 564/123, 564/133, 134, 138, 142; 524/538
See application file for complete search history.

(56) References Cited

U.S. PATENT DOCUMENTS

| | | |
|---|---|---|
| 3,242,218 A | 3/1966 | Miller |
| 3,250,807 A | 5/1966 | Fritz et al. |
| 3,250,808 A | 5/1966 | Moore et al. |
| 3,274,239 A | 9/1966 | Selman |
| 3,293,306 A | 12/1966 | Le Bleu et al. |
| 3,322,826 A | 5/1967 | Moore |
| 3,536,749 A | 10/1970 | Groves |
| 3,544,537 A | 12/1970 | Brace |
| 3,553,179 A | 1/1971 | Bartlett |
| 3,766,251 A | 10/1973 | Caporiccio et al. |
| 3,810,874 A | 5/1974 | Mitsch et al. |
| 3,864,318 A | 2/1975 | Caporiccio et al. |
| 4,085,137 A | 4/1978 | Mitsch et al. |
| 4,094,911 A | 6/1978 | Mitsch et al. |
| 4,256,560 A | 3/1981 | Buchwalter et al. |
| 4,262,072 A | 4/1981 | Wendling et al. |
| 4,321,404 A | 3/1982 | Williams et al. |
| 4,440,918 A | 4/1984 | Rice et al. |
| 4,472,480 A | 9/1984 | Olson |
| 4,567,073 A | 1/1986 | Larson et al. |
| 4,596,844 A | 6/1986 | Ohsawa et al. |
| 4,614,667 A | 9/1986 | Larson et al. |
| 4,647,413 A | 3/1987 | Savu |
| 4,654,233 A | 3/1987 | Grant et al. |
| 4,665,144 A | 5/1987 | Ohmori et al. |
| 4,681,925 A | 7/1987 | Strepparola et al. |
| 4,746,550 A | 5/1988 | Strepparola et al. |
| 4,818,801 A | 4/1989 | Rice et al. |
| 4,830,910 A | 5/1989 | Larson |
| 4,853,097 A | 8/1989 | Marchionni et al. |
| 4,855,184 A | 8/1989 | Klun et al. |
| 4,873,140 A | 10/1989 | McIntyre |
| 4,968,116 A | 11/1990 | Hulme-Lowe et al. |
| 4,971,424 A | 11/1990 | Babirad et al. |
| 5,002,978 A | 3/1991 | Goldenberg |
| 5,021,501 A | 6/1991 | Ohmori et al. |
| 5,057,585 A | 10/1991 | Agou et al. |
| 5,059,700 A | 10/1991 | Marchionni et al. |
| 5,076,844 A | 12/1991 | Fock et al. |
| 5,239,026 A | 8/1993 | Babirad et al. |
| 5,306,758 A | 4/1994 | Pellerite |
| 5,326,823 A | 7/1994 | Rolando et al. |
| 5,534,558 A | 7/1996 | Minns |
| 5,623,037 A | 4/1997 | Simeone et al. |
| 5,718,833 A | 2/1998 | Yamamoto et al. |
| 5,822,489 A | 10/1998 | Hale |
| 5,948,478 A | 9/1999 | Lenti et al. |
| 5,962,611 A | 10/1999 | Meijs et al. |
| 5,973,089 A | 10/1999 | Meijs et al. |
| 6,127,498 A | 10/2000 | Tonelli et al. |
| 6,160,148 A | 12/2000 | Dauth et al. |
| 6,184,339 B1 | 2/2001 | Stansbury et al. |
| 6,224,949 B1 | 5/2001 | Wright et al. |
| 6,238,798 B1 | 5/2001 | Kang et al. |
| 6,299,799 B1 | 10/2001 | Craig et al. |
| 6,376,572 B1 | 4/2002 | Turri |
| 6,383,633 B1 | 5/2002 | Allewaert et al. |
| 6,395,822 B1 | 5/2002 | Edgington |
| 6,403,760 B1 | 6/2002 | Weinert et al. |

(Continued)

FOREIGN PATENT DOCUMENTS

EP 0 622 353 A2 11/1994

(Continued)

OTHER PUBLICATIONS

Shacklette et al., "Ultra-Low-Loss Polymers for Planar Photonic Applications Derived from Fluorinated Acrylate Monomers", Fluoropolymer 2002 Current Frontiers and Future Trends (2002), Preprint No. 7, 2 pages.

Gelin et al., "Fluorniated Block Copolymers Containing Poly(vinylidene fluoride) or Poly(vinylidene fluoride-co-hexafluoropropylene) Blocks from Perfluropolyethers: Synthesis and Thermal Properties", Journal of Polymer Science: Part A: Polymer Chemistry, (2003), vol. 41, pp. 160-171.

Product Data Sheet: Solvay Solexis, "Fomblin Z Derivatives", Solvay Solexis, Inc. (2002), pp. 1-3.

Bongiovanni et al., "Perfluoropolyether Structures as Surface Modifying Agents of UV-curable Systems", Macromol. Chem. Phys. 199, (1998) pp. 1099-1105.

(Continued)

*Primary Examiner*—Ana Woodward
(74) *Attorney, Agent, or Firm*—Bradford B. Wright

(57) ABSTRACT

A composition comprises a condensation product of an amine-reactive fluorinated polyether and a polyamine. The compositions may be in dispersed in water.

22 Claims, No Drawings

U.S. PATENT DOCUMENTS

| | | |
|---|---|---|
| 6,452,038 B1 | 9/2002 | Rao et al. |
| 6,558,803 B1 | 5/2003 | Malik |
| 6,660,388 B2 | 12/2003 | Liu et al. |
| 6,660,389 B2 | 12/2003 | Liu et al. |
| 6,664,354 B2 | 12/2003 | Savu et al. |
| 2002/0115820 A1 | 8/2002 | Wang et al. |
| 2003/0026997 A1 | 2/2003 | Qiu et al. |
| 2003/0068486 A1 | 4/2003 | Arney et al. |
| 2003/0226818 A1 | 12/2003 | Dunbar et al. |
| 2005/0250921 A1 | 11/2005 | Qiu et al. |

FOREIGN PATENT DOCUMENTS

| | | |
|---|---|---|
| EP | 0 851 246 A1 | 1/1998 |
| EP | 1 057 849 A2 | 6/2000 |
| EP | 1 227 076 A2 | 7/2002 |
| JP | 61-111308 | 5/1986 |
| JP | 3-39928 | 2/1991 |
| JP | 5-209030 | 8/1993 |
| JP | 6-40748 | 2/1994 |
| JP | 6-211945 | 8/1994 |
| JP | 2000-301053 | 4/1999 |
| JP | 2001-301053 | 10/2001 |
| JP | 2002-6102 | 1/2002 |
| WO | WO 02/02668 A2 | 1/2002 |
| WO | WO 02/12404 A2 | 2/2002 |
| WO | WO 03/022906 A1 | 3/2003 |
| WO | WO 2004/002734 A1 | 1/2004 |
| WO | WO 2005/113642 A1 | 12/2005 |

OTHER PUBLICATIONS

Bongiovanni et al., "U-V Curing of Fluorinated Systems: Synthesis and Properties", ACS Symposium Series 847, Photoinitiated Polymerization, American Chemical Society, (2003), Chapter 41, pp. 499-511.

Roscoe et al., "Fluorinated Polyether Compositions", U.S. Appl. No. 10/331,816, filed Dec. 30, 2002.

Buckanin et al., "Coating Compositions with Reactive Fluorinated Copolymers Having Pendant Perfluoropolyether Groups", U.S. Appl. No. 10/738,185, filed Dec. 17, 2003.

Klun et al., "Polymerizable Compositions, Methods of Making the Same, and Composite Articles Therefrom", U.S. Appl. No. 10/841,792, filed May 7, 2004.

Coggio et al., "Article Comprising Fluorochemical Surface Layer", U.S. Appl. No. 10/841,159, filed May 7, 2004.

FLUORINATED POLYETHER POLYAMINE AND METHOD OF MAKING THE SAME

BACKGROUND

Fluorinated polyethers have useful properties that include low refractive index, soil resistance, lubricity, and high water repellency. Accordingly, fluorinated polyethers have been incorporated into various protective coatings to provide one or more of low refractive index, cleanability, durability, and scratch resistance.

However, fluorinated polyethers typically are only soluble or dispersible in organic solvents, and in particular in costly fluorinated organic solvents. Further, if such solutions or dispersions containing volatile organic solvent are coated on a substrate. Given the recent trend in industry to remove volatile organic solvent from chemical formulations, there remains a continuing need for fluorinated polyether materials that are soluble or dispersible in solvents other than organic solvents.

SUMMARY

In one aspect, the present invention provides a composition comprising at least one compound described by the formula

or an acid salt thereof, wherein $X^1$ represents H, an alkyl group having from 1 to 8 carbon atoms, or an aryl group having from 6 to 10 carbon atoms; and $X^2$ represents $-NR^1H$;

each $R^1$ independently represents H, an alkyl group having from 1 to 8 carbon atoms, an aminoalkyl group having from 2 to 8 carbon atoms, a hydroxyalkyl group having from 2 to 8 carbon atoms or Z;

each $R^2$ independently represents an alkylene group having from 2 to 8 carbon atoms;

Z represents

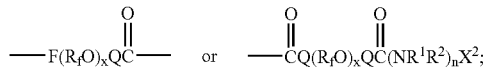

each $R_f$ independently represents a fluorinated alkylene group having from 1 to 6 carbon atoms;

each Q independently represents $-CF_2-$, $-CF(CF_3)-$, $-CF_2CF_2-$, $-CF_2CF_2CF_2-$, $-CF_2CF(CF_3)-$, $-CF(CF_3)CF_2-$, $-CF_2CF_2CF_2-$, $-CF_2CH_2-$, or $CF(CF_3)CH_2-$; and n and x independently represent integers greater than 2.

wherein the compound has at least three Z groups, and wherein the number of primary and secondary amino groups in the compound is at least 3.

In another aspect the present invention provides method of making a composition comprising:

(a) providing at least one reactive fluorinated polyether described by the formula

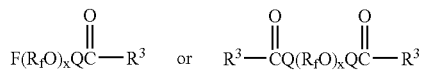

wherein each $R_f$ independently represents a fluorinated alkylene group having from 1 to 8 carbon atoms;

$R^3$ represents alkoxy having from 1 to 8 carbon atoms, fluorine, or chlorine;

each x independently represents an integer greater than or equal to 2;

each Q independently represents $-CF_2-$, $-CF(CF_3)-$, $-CF_2CF_2-$, $-CF_2CH_2-$, $-CF_2CF_2CF_2-$, $-CF_2CF(CF_3)-$, $-CF(CF_3)CF_2-$, $-CF_2CF_2CH_2-$, or $-CF(CF_3)CH_2-$;

(b) providing at least one polyamine described by the formula

wherein $X^1$ represents H, an alkyl group having from 1 to 8 carbon atoms, or an aryl group having from 6 to 10 carbon atoms;

$X^2$ represents $-NR^1H$;

each $R^1$ independently represents H, an alkyl group having from 1 to 8 carbon atoms, or a hydroxyalkyl group having from 2 to 8 carbon atoms, or Z;

each $R^2$ independently represents an alkylene group having from 2 to 8 carbon atoms;

Z represents

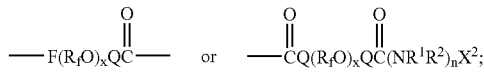

each $R_f$ independently represents a fluorinated alkylene group having from 1 to 6 carbon atoms;

each Q independently represents $-CF_2-$, $-CF(CF_3)-$, $-CF_2CF_2-$, $-CF_2CF_2CF_2-$, $-CF_2CF(CF_3)-$, $-CF(CF_3)CF_2-$, $-CF_2CF_2CH_2-$, $-CF_2CH_2-$, or $-CF(CF_3)CH_2-$; and each n and x independently represent integers greater than 2, wherein the polyamine has at combined total of at least three primary and secondary amino groups; and (c) combining the reactive fluorinated polyether and the polyamine under conditions sufficient to form an amide condensate thereof, wherein the molar ratio of reactive fluorinated polyether to polyamine is at least three.

Compositions according to the present invention are typically dispersible in aqueous media, and are versatile synthetic intermediates for a wide variety of polymerizable derivatives.

In another aspect, the present invention provides a dispersion having a continuous aqueous phase, the dispersion comprising at least one compound described by the formula

or an acid salt thereof, wherein $X^1$ represents H, an alkyl group having from 1 to 8 carbon atoms, or an aryl group having from 6 to 10 carbon atoms; and $X^2$ represents $-NR^1H$;

each $R^1$ independently represents H, an alkyl group having from 1 to 8 carbon atoms, an aminoalkyl group having from 2 to 8 carbon atoms, a hydroxyalkyl group having from 2 to 8 carbon atoms, or Z;

each $R^2$ independently represents an alkylene group having from 2 to 8 carbon atoms;

Z represents

each $R_f$ independently represents a fluorinated alkylene group having from 1 to 6 carbon atoms;
each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, or —$CF(CF_3)CH_2$—; and
n and x independently represent integers greater than 2, wherein the compound has at least one Z group, and wherein the number of primary and secondary amino groups in the compound is at least 3.

In yet another aspect, the present invention provides a method of making a dispersion comprising:
(a) providing at least one reactive fluorinated polyether described by the formula

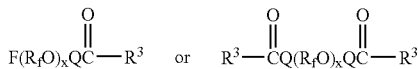

wherein
each $R_f$ independently represents a fluorinated alkylene group having from 1 to 8 carbon atoms;
$R^3$ represents alkoxy having from 1 to 8 carbon atoms, fluorine, or chlorine;
each x independently represents an integer greater than or equal to 2;
each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, or —$CF(CF_3)CH_2$—;
(b) providing at least one polyamine described by the formula $X^1(NR^1R^2)_nX^2$ wherein
$X^1$ represents H, an alkyl group having from 1 to 8 carbon atoms, or an aryl group having from 6 to 10 carbon atoms;
$X^2$ represents —$NR^1H$;
each $R^1$ independently represents H, an alkyl group having from 1 to 8 carbon atoms, or a hydroxyalkyl group having from 2 to 8 carbon atoms, or Z;
each $R^2$ independently represents an alkylene group having from 2 to 8 carbon atoms;
Z represents

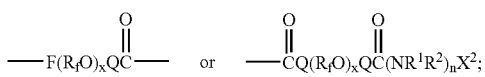

each $R_f$ independently represents a fluorinated alkylene group having from 1 to 6 carbon atoms;
each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF(CF_3)CF_2$—, —$CF_2CF_2CH_2$—, —$CF_2CH_2$—, or —$CF(CF_3)CH_2$—; and
each n and x independently represent integers greater than 2,
wherein the polyamine has at combined total of at least three primary and secondary amino groups; and
(c) combining the reactive fluorinated polyether and the polyamine under conditions sufficient to form an aqueous dispersion of an amide condensate thereof.

DETAILED DESCRIPTION

The present invention provides compositions that may be prepared according to a method in which at least one amine-reactive fluorinated polyether acid derivative such as, for example, esters (e.g., alkyl esters having from 1 to 8 carbon atoms) and acid halides (e.g., acid fluoride or acid chloride) is condensed with a primary and/or secondary amine.

Useful amine-reactive fluorinated polyether acid derivatives are described by the formula

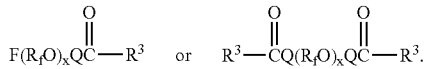

Each $R_f$ independently represents a fluorinated alkylene group having from 1 to 6 carbon atoms. For example, $R_f$ may be a partially fluorinated group such as —$CF_2CF_2CH_2$—, —$CH_2CF_2CH_2$—, or a perfluorinated alkylene group having from 1 to 6 carbon atoms such as —$CF_2$—, —$CF(CF_3)$—, —$CF_2CF_2$—, —$CF_2CF_2CF_2$—, —$CF(CF_3)CF_2$—, —$CF_2CF(CF_3)$—, —$(CF_2)_5$—, or —$(CF_2)_6$—. Since each $R_f$ is independently selected, —$(R_fO)_x$— may thus represent, for example, —$(CF(CF_3)CF_2O)_8$—, —$(CF_2CF_2O)_3(CF(CF_3)CF_2O)_{12}$—, —$(CF_2CF_2O)_2(CF(CF_3)CF_2O)_{98}(CF_2CF_2O)$—, —$CF_2O(CF_2CF_2O)_m(CF_2O)_mCF_2$—, where the ratio of m/n is in a range of from 0.2/1 to 5/1 (e.g., in a range of from 0.5/1 to 3/1 or 0.7/1 to 1.6/1) with the number average molecular weight ($M_n$) in a range of from about 500 to about 10,000 g/mol, or —$CF(CF_3)(OCF_2CF(CF_3))_nO(CF_2)_5O(CF(CF_3)CF_2O)_mCF(CF_3)$—, wherein n+m is in a range of from about 6 up to about 12.

Each x independently represents an integer greater than or equal to 2. For example, x may be greater than 3 or greater than 4.

$R^3$ represents an alkoxy group having from 1 to 8 carbon atoms, fluorine, or chlorine. For example, $R^3$ may be methoxy, ethoxy, isopropoxy, or butoxy. $R^3$ may be may be linear, cyclic, and/or branched.

Methods for making such fluorinated polyethers having an amine-reactive end group are well known. Further details procedures for the preparation of such compounds can be found in, for example, U.S. Pat. No. 3,242,218 (Miller); U.S. Pat. No. 3,322,826 (Moore); U.S. Pat. No. 3,250,808 (Moore et al.); U.S. Pat. No. 3,274,239 (Selman); U.S. Pat. No. 3,293,306 (Le Bleu et al.); U.S. Pat. No. 3,810,874 (Mitsch et al.); U.S. Pat. No. 3,544,537 (Brace); U.S. Pat. No. 3,553,179 (Bartlett); U.S. Pat. No. 3,864,318 (Caporiccio et al.); U.S. Pat. No. 4,321,404 (Williams et al.), U.S. Pat. No. 4,647,413 (Savu); U.S. Pat. No. 4,818,801 (Rice et al.); U.S. Pat. No. 4,472,480 (Olson); U.S. Pat. No. 4,567,073 (Larson et al.); U.S. Pat. No. 4,830,910 (Larson); and U.S. Pat. No. 5,306,758 (Pellerite), the disclosures of which are incorporated herein by reference. Although fluorinated polyethers having an amine-reactive end group are generally available in a range of molecule weights range, in some applications it may be desirable that the number average molecular weight of the fluorinated polyethers be at least about 1,000 g/mole, although this is not a requirement.

The amine-reactive fluorinated polyether acid derivative is combined with a polyamine having a combined total of at least 3 (e.g., 4, 5, 6, 10, 20, 50, 100, or even more) primary and secondary amine nitrogen atoms to form an amide condensate. The molar ratio of amine-reactive fluorinated polyether acid derivatives to amine, which are combined to form aqueous dispersions of the present invention, may have any ratio greater than zero. However, the molar ratio of amine-reactive fluorinated polyether acid derivatives that may be used if forming amide condensates in forms other than as an aqueous dispersion is at least 3 (e.g., 3:1, 4:1, 5:1, 10:1, 20:1, up to 50:1, or more). Higher molar ratios are typically desirable for applications in which low energy substrates are to be coated with the composition, while low ratios are typically desirable if water dispersibility is desired. Two or more amide condensates may be blended, for example, as in the case of statistical mixtures (e.g., 2.5:1 condensate), although it will be recognized that the mixture will comprise some material having a molar ratio of at least 3:1.

The stoichiometry of addition of the amine-reactive fluorinated polyether acid derivative to polyamine may be selected such that the resultant amide condensate has at least one or even at least two primary and/or secondary amino groups, for example, which may be used to covalently attach additional functionality to the amide condensate.

Typically, primary amino groups are more reactive to the amine-reactive fluorinated polyether acid derivative than secondary amino groups. It is typically possible therefore to control the condensation conditions in order to cause preferential reaction with primary amino groups in preference to secondary groups. For example, with fluorinated polyethers having ester groups, a reaction temperature in a range of from about 50° C. up to about 80° C. typically results in amide condensates with primary amino groups, but not with secondary amino groups that typically need a higher temperature (e.g., 100-120° C.) to form.

In one embodiment, some or all of the amino groups of the polyamine may be deactivated by reaction with an amine reactive group (e.g., an acid derivative such as an ester, alkyl carbonate, or acid halide), and in a second step a fluorinated polyether can be reacted with remaining amino groups (e.g., primary and/or secondary amino groups) of the polyamine. In one useful method, deactivation or primary amines may accomplished using one or more amine-protecting groups (i.e., blocking groups) that can be later removed, for example, after reaction of one or more secondary amino groups with an amine-reactive fluorinated polyether acid derivative. Useful amine-protecting groups and methods for their use and removal are well known in the chemical arts.

Useful polyamines are described by the formula

wherein:

$X^1$ represents H, an alkyl group having from 1 to 8 carbon atoms (e.g., methyl, ethyl, isopropyl, hexyl, isooctyl), an aryl group having from 6 to 10 carbon atoms (e.g., phenyl, chlorophenyl, naphthyl), an alkaryl group having from 7 to 15 carbon atoms (e.g., 4-tolyl, 2-methylphenyl, 2,4-dimethylphenyl, octylphenyl), or an aralkyl group having from 7 to 15 carbon atoms (e.g., phenylethyl, 2-chlorophenylhexyl, (2',4'-dimethylphenyl)propyl, phenylnonyl). $X^1$ may be linear, cyclic, and/or branched.

$X^2$ represents —$NR^1H$.

$R^1$ represents H, an alkyl group having from 1 to 8 carbon atoms (e.g., methyl, ethyl, propyl, hexyl, isooctyl), an aminoalkyl group having from 2 to 8 carbon atoms, or a hydroxyalkyl group having from 2 to 8 carbon atoms. $R^1$ may be may be linear, cyclic, and/or branched.

Each $R^2$ independently represents an alkylene group having from 2 to 8 carbon atoms (e.g., ethylene, propylene, hexylene). $R^2$ may be may be linear, cyclic, and/or branched.

n represents an integer greater than 2 (e.g., 3, 4, 5, 15, 50, 100 or more).

Examples of useful polyamines include polyamines having at least three amino groups, wherein the three amino groups are primary, secondary, or a combination thereof. Examples include $H_2N(CH_2CH_2NH)_2H$, $H_2N(CH_2CH_2NH)_3H$, $H_2N(CH_2CH_2NH)_4H$, $H_2N(CH_2CH_2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2CH_2NH)_2H$, $H_2N(CH_2)_3NHCH_2CH=CHCH_2NH(CH_2)_3NH_2$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn.

In some embodiments, compositions according to the present invention are dispersible or soluble organic solvent and/or water. For example, compositions according to the present invention may comprise at least 5, 10, or 20 percent by weight up to 30 percent or more of an aqueous dispersion or solution, enabling, for example, formulation of water-based, solvent-free formulations of the compositions. Typically, dispersibility and solubility depend at least in part on the ratio of primary, secondary, and quaternary amine groups to fluorinated polyether group(s) in the composition, with higher ratios favoring dispersibility and/or solubility.

Compositions according to the present invention, whether in purified form or as dispersions, and useful for forming protective and/or lubricious coatings on substrates.

Compositions of the present invention may exist in free base form or as an acid salt (e.g., the salt of the free base form of the composition and a Bronsted acid such as sulfuric acid, nitric acid, hydrochloric acid acetic acid). Methods for forming and isolating acid salts of amines, are well within the capability of one skilled in the chemical arts.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Aldrich Company, Milwaukee, Wis., or Pfaltz and Bauer, Inc., Waterbury, Conn., or may be synthesized by conventional methods.

The following abbreviations are used throughout the following examples:

| ABBRE-VIATION | DESCRIPTION |
|---|---|
| FC-1 | $F(CF(CF_3)CF_2O)_aCF(CF_3)C(=O)OCH_3$, wherein a averages 5.15, average molecular weight = 1,029 g/mol, and which can be prepared according to the method reported in U.S. Pat. No. 3,250,808 (Moore et al.), the disclosure of which is incorporated herein by reference, with purification by fractional distillation.. |
| FC-2 | $F(CF(CF_3)CF_2O)_aCF(CF_3)C(=O)OCH_3$, wherein a averages 6.3, average molecular weight = 1,211 g/mol, and which can be prepared according to the method reported in U.S. Pat. No. 3,250,808 (Moore et al.), with purification by fractional distillation. |
| FC-3 | believed to have the formula $CH_3OC(=O)CF_2O(CF_2CF_2O)_m(CF_2O)_nCF_2C(=O)OCH_3$, with average molecular weight of about 2,000 g/mol, available from Ausimont USA, Thorofare, New Jersey under the trade designation "FOMBLIN Z-DEAL" |

Further, as used hereinbelow: mm=millimeters, g=grams, mg=milligrams, mol=mole, mmol=millimole, meq=milliequivalents, mL=milliliters, and $C_6H_5$=phenyl.

Example 1

This example describes the preparation of a 4:1 molar ratio amide condensate of FC-1 with $H_2N(CH_2CH_2NH)_5H$.

In a 500 mL flask, 200 g of FC-1 (200 mmol) was mixed with 11.62 g of $H_2N(CH_2CH_2NH)_5H$ (50 mmol), and heated at 100-110° C. while mechanically stirred. In less than 20 minutes, the mixture became a clear homogenous solution. Heating was continued for 5 more hours, at which time infrared spectroscopic analysis showed that the absorption band at 1787 cm$^{-1}$, attributed to the ester carbonyl group of FC-1, had completely disappeared and a new absorption band at 1718 cm$^{-1}$, attributed to the corresponding amide linkage, was observed.

After removal of methanol under reduced pressure using a rotary evaporator, 5.4 g of the resultant residue was dispersed into 40 g of water and 5 g of isopropanol. The isopropanol was removed under reduced pressure using a rotary evaporator to give 36.5 of a light yellow clear liquid with pH of approximately 8, which was 13.8 percent solids by weight.

Example 2

This example describes the preparation of a 3:1 molar ratio amide condensate of FC-1 with $H_2N(CH_2CH_2NH)_5H$.

In a sealed 120 mL glass tube, 10 g (10 mmol) of FC-1 was mixed with 0.77 g of $H_2N(CH_2CH_2NH)_5H$ (3.3 mmol), and the mixture was heated at 110° C. for 4 hours with magnetic stirring. Infrared spectroscopic analysis showed that the absorption band at 1787 cm$^{-1}$, attributed to the ester carbonyl group of FC-1, had completely disappeared and a new absorption band at 1711 cm$^{-1}$, attributed to the corresponding amide linkage, was observed. The resultant product was a light yellow liquid.

Example 3

This example describes the preparation of a 2:1 molar ratio amide condensate of FC-1 with $H_2N(CH_2CH_2NH)_5H$.

In a sealed 120 mL glass tube, 20 g (20 mmol) of FC-1 was mixed with 2.32 g of $H_2N(CH_2CH_2NH)_5H$ (10 mmol), and the mixture was heated at 110° C. for 4 hours with magnetic stirring. Infrared spectroscopic analysis showed that the absorption band at 1787 cm$^{-1}$, attributed to the ester carbonyl group of FC-1, had completely disappeared and a new absorption band at 1712 cm$^{-1}$, attributed to the corresponding amide linkage, was observed.

A 20 g sample of the resultant product was added to 82 g of water at a temperature of approximately 80° C. with fast stirring, resulting in a clear liquid that was 17 percent solids by weight.

Example 4

This example describes the preparation of a 1.5:1 molar ratio amide condensate of FC-1 with $H_2N(CH_2CH_2CH_2NH)_2H$.

In a sealed 120 mL glass tube, 15 g (15 mmol) of FC-1 was mixed with 1.31 g of $H_2N(CH_2CH_2CH_2NH)_5H$ (10 mmol), and the mixture was heated at 110° C. for 4 hours with magnetic stirring. Infrared spectroscopic analysis showed that the absorption band at 1787 cm$^{-1}$, attributed to the ester carbonyl group of FC-1, had completely disappeared and a new absorption band at 1712 cm$^{-1}$, attributed to the corresponding amide linkage, was observed.

A 15 g sample of the resultant product was added to a solution of 120 g of water and 20 g of isopropanol at approximately 80° C. with fast stirring over 10 minutes. Evaporation of the isopropanol and water under reduced pressure gave 110.3 g of a clear liquid that was 13.6 percent solids by weight.

Example 5

This example describes the preparation of a 2:1 molar ratio amide condensate of FC-1 with $N(CH_2CH_2NH_2)_3$.

In a sealed 120 mL glass tube, 40 g (40 mmol) of FC-1 was mixed with 2.92 g of $N(CH_2CH_2NH_2)_3$ (20 mmol), and the mixture was heated at 110° C. for 2 hours with magnetic stirring. Infrared spectroscopic analysis showed that the absorption band at 1787 cm$^{-1}$, attributed to the ester carbonyl group of FC-1, had completely disappeared and a new absorption band at 1710 cm$^{-1}$, attributed to the corresponding amide linkage, was observed.

A 10 g sample of the resultant product was added to a solution of 120 g of water and 10 g of isopropanol at approximately 80° C. with fast stirring over 10 minutes. Evaporation of the isopropanol and water under reduced pressure gave 100 g of a clear liquid that was 10 percent solids by weight.

Example 6

This example describes the preparation of an acid salt of a 2:1 molar ratio amide condensate of FC-1 with $H_2N(CH_2CH_2NH)_5H$.

In a sealed 120 mL glass tube, 20.58 g of FC-1 (20 mmol) was mixed with 2.32 g of $H_2N(CH_2CH_2NH)_5H$ (10 mmol), and the mixture was heated at 110° C. for 4 hours with magnetic stirring. Infrared spectroscopic analysis showed that the absorption band at 1787 cm$^{-1}$, attributed to the ester carbonyl group of FC-1, had completely disappeared and a new absorption band at 1718 cm$^{-1}$, attributed to the corresponding amide linkage, was observed.

The resultant product was added to a solution of 2.7 g of acetic acid in 150 g of water at approximately 80° C. with fast stirring. A liquid was obtained that was 14.26 percent solids by weight and had a pH in a range of from 6.5 to 7.

Example 7

This example describes the preparation of a 2:1 molar ratio amide condensate of FC-2 to $H_2N(CH_2CH_2NH)_5H$.

A flask was charged with 50 g (41.29 mmol) of FC-2 and 4.80 g (20.64 mmol) of $H_2N(CH_2CH_2NH)_5H$, both at room temperature, resulting in a cloudy solution. The flask was swirled and the temperature of the mixture rose to 45° C. resulting in a water-white liquid, which was heated overnight at 55° C.

Infrared spectroscopic analysis showed that the absorption band at 1793 cm$^{-1}$, attributed to the ester carbonyl group of FC-2, had completely disappeared and a new absorption band at 1713 cm$^{-1}$, attributed to the corresponding amide linkage, was observed. The product was then placed on a rotary evaporator at 75° C. and aspirator pressure to remove methanol, yielding a viscous slightly yellow liquid.

Example 8

This example describes the preparation of a 2:1 molar ratio amide condensate of FC-2 with $H_2N(CH_2CH_2NH)_{9.44}H$.

A 4 ounce (120 mL) bottle was charged with 28.71 g (23.71 mmol) of FC-2 and 5.01 g of $H_2N(CH_2CH_2NH)_{9.44}H$ ($M_n$=423 g/mol, available as Catalog Number 46,853-3 from Aldrich Chemical Company, 11.84 mmol). The mixture was heated at 75° C. for one hour with a magnetic stir bar, giving a milky and cloudy liquid. The reaction temperature was increase to 100° C. and continued reaction for another hour. However, the mixture was still not clear. Infrared spectroscopic analysis showed that the absorption band at 1793 cm$^{-1}$, attributed to the ester carbonyl group of FC-2, had completely disappeared and a new absorption band at 1713 cm$^{-1}$, attributed to the corresponding amide linkage, was observed.

Example 9

This example describes the preparation of a 5:1 molar ratio amide condensate of FC-2 with $H_2N(CH_2CH_2NH)_{9.44}H$.

A 4 ounce (120 mL) bottle was charged with 30.10 g (24.86 mmol) of FC-2 and 2.10 g $H_2N(CH_2CH_2NH)_{9.44}H$ ($M_n$=423 g/mol, available as Catalog Number 46,853-3 from Aldrich Chemical Company, 4.96 mmol). The mixture was reacted at 110° C. for 10 minutes with a magnetic stir bar, and a clear solution was generated. By infrared spectroscopic analysis, a small absorption at 1791-1 (<10 percent) was observed with a stronger new absorption at 1709$^{-1}$(>90 percent), indicating unfinished reaction. After continuing the reaction for two hours, infrared spectroscopic analysis showed that the absorption band at 1793 cm$^{-1}$, attributed to the ester carbonyl group of FC-2, had completely disappeared and a new absorption band at 1706 cm$^{-1}$, attributed to the corresponding amide linkage, was observed.

Example 10

This example describes the preparation of a 2:1 molar ratio amide condensate of FC-2 with $—(NHCH_2CH_2)_x—(N(CH_2CH_2NH_2)CH_2CH_2)_y—$.

A 4 ounce (120 mL) bottle was charged with 24.22 g (20 mmol) of FC-2 and 6.0 g of $—(NHCH_2CH_2)_x(N(CH_2CH_2NH_2)CH_2CH_2)_y—$ ($M_n$=600 g/mol, $M_w$=800 g/mol available as Catalog Number 40,871-9 from Aldrich Chemical Company, 10 mmol). The mixture was reacted at 110° C. for two hours. The mixture remained cloudy and highly viscous. Infrared spectroscopic analysis showed that the absorption band at 1787 cm$^{-1}$, attributed to the ester carbonyl group of FC-2, had completely disappeared and a new absorption band at 1714 cm$^{-1}$, attributed to the corresponding amide linkage, was observed.

A portion (10 g) of the resultant material was mixed with 50 g of water and 10 g of isopropanol, which was phase separated. By addition of 5 percent aqueous hydrochloric acid, a clear solution was obtained.

Example 11

This example describes the preparation of a 8:1 molar ratio amide condensate of FC-2 with $—(NHCH_2CH_2)_x(N(CH_2CH_2NH_2)CH_2CH_2)_y—$.

A 4 ounce (120 mL) bottle was charged with 30.0 g of FC-2 (24.77 mmol) and 1.86 g of $—(NHCH_2CH_2)_x(N(CH_2CH_2NH_2)CH_2CH_2)_y—$ ($M_n$=600 g/mol, available as Catalog Number 40,871-9 from Aldrich Chemical Company, 3.1 mmol). The mixture was heated at 110° C. for two hours to give a clear liquid. Infrared spectroscopic analysis showed that the absorption band at 1787 cm$^{-1}$, attributed to the ester carbonyl group of FC-2, had completely disappeared and a new absorption band at 1713 cm$^{-1}$, attributed to the corresponding amide linkage, was observed.

Example 12

This example describes the preparation of a 20:1 molar ratio amide condensate of FC-2 with $—(NHCH_2CH_2)_x(N(CH_2CH_2NH_2)CH_2CH_2)_y—$.

Into a 100 mL flask was placed 10 g (0.0025 mmol) of polyethylenimine branched polymer with average $M_w$=2000 g/mol (50 weight percent solution in water, available from Aldrich Chemical Company as Catalog Number 40,870-0). To the flask was added 60 g (0.050 mmol) of FC-2 and 10 mL of dimethylformamide. The solution was well stirred, and subsequently the solution was heated at 80 to 90° C. under the nitrogen for two days. The reaction mixture became one phase after reaction and the resulting product was purified by washing three times with a small amount of cold water.

Various modifications and alterations of this invention may be made by those skilled in the art without departing from the scope and spirit of this invention, and it should be understood that this invention is not to be unduly limited to the illustrative embodiments set forth herein.

What is claimed is:

1. A composition comprising at least one compound described by the formula

$$X^1(NR^1R^2)_nX^2$$

or an acid salt thereof, wherein $X^1$ represents H, an alkyl group having from 1 to 8 carbon atoms, or an aryl group having from 6 to 10 carbon atoms; and $X^2$ represents $—NR^1H$;

each $R^1$ independently represents H, an alkyl group having from 1 to 8 carbon atoms, an aminoalkyl group having from 2 to 8 carbon atoms, a hydroxyalkyl group having from 2 to 8 carbon atoms, or Z;

each $R^2$ independently represents an alkylene group having from 2 to 8 carbon atoms;

Z represents

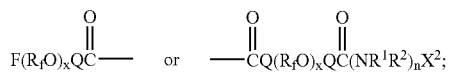

each $R_f$ independently represents a fluorinated alkylene group having from 1 to 6 carbon atoms;
each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, or —$CF(CF_3)CH_2$—; and
n and x independently represent integers greater than 2, wherein the compound has at least three Z groups, and wherein the number of primary and secondary amino groups in the compound is at least 3.

2. The composition of claim 1, wherein each $R_f$ independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, or —$CF(CF_3)CH_2$—.

3. The composition of claim 1, wherein $R^1$ is described by the formula

and wherein a is an integer greater than 2.

4. The composition of claim 3, wherein, $R^2$ is —$CH_2CH_2$— and n is 5.

5. The composition of claim 1, wherein $R^1$ is described by the formula

and wherein a is an integer greater than 4.

6. The composition of claim 1, wherein each $R^2$ independently represents an alkylene group having 2 or 3 carbon atoms.

7. The composition of claim 1, wherein $X^2$ represents —$NH_2$.

8. The composition of claim 7, wherein $X^1$ represents H.

9. The composition of claim 1, wherein n represents an integer greater than 4.

10. The composition of claim 1, wherein at least one compound comprises a combined total of at least twenty Z groups.

11. A dispersion having a continuous aqueous phase, the dispersion comprising at least one compound described by the formula $X^1(NR^1R^2)_nX^2$ or an acid salt thereof, wherein
$X^1$ represents H, an alkyl group having from 1 to 8 carbon atoms, or an aryl group having from 6 to 10 carbon atoms; and
$X^2$ represents —$NR^1H$;
each $R^1$ independently represents H, an alkyl group having from 1 to 8 carbon atoms, an aminoalkyl group having from 2 to 8 carbon atoms, a hydroxyalkyl group having from 2 to 8 carbon atoms, or Z;
each $R^2$ independently represents an alkylene group having from 2 to 8 carbon atoms;
Z represents

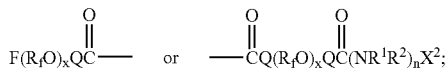

each $R_f$ independently represents a fluorinated alkylene group having from 1 to 6 carbon atoms;
each Q independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, or —$CF(CF_3)CH_2$—; and
n and x independently represent integers greater than 2, wherein the compound has at least three Z groups, and wherein the number of primary and secondary amino groups in the compound is at least 3.

12. The dispersion of claim 11, wherein each $R_f$ independently represents —$CF_2$—, —$CF(CF_3)$—, —$CF_2CF_2$—, —$CF_2CF_2CF_2$—, —$CF_2CF(CF_3)$—, —$CF(CF_3)CF_2$—, —$CF_2CF_2CH_2$—, —$CF_2CH_2$—, or —$CF(CF_3)CH_2$—.

13. The dispersion of claim 11, wherein $R^1$ is described by the formula

and wherein a is an integer greater than 2.

14. The dispersion of claim 11, wherein, $R^2$ is —$CH_2CH_2$— and n is 5.

15. The dispersion of claim 11, wherein $R^1$ is described by the formula

and wherein a is an integer greater than 4.

16. The dispersion of claim 11, wherein each $R^2$ independently represents an alkylene group having 2 or 3 carbon atoms.

17. The dispersion of claim 11, wherein $X^2$ represents —$NH_2$.

18. The dispersion of claim 17, wherein $X^1$ represents H.

19. The dispersion of claim 11, wherein n represents an integer greater than 4.

20. The dispersion of claim 11, wherein at least one compound comprises at least twenty Z groups.

21. The dispersion of claim 11, wherein the dispersion is essentially free of organic solvent.

22. The dispersion of claim 11, wherein the dispersion does not comprise an acid salt.

* * * * *

UNITED STATES PATENT AND TRADEMARK OFFICE
CERTIFICATE OF CORRECTION

PATENT NO.          : 7,288,619 B2
APPLICATION NO.     : 10/840969
DATED               : October 30, 2007
INVENTOR(S)         : Zai-Ming Qiu It is certified that error appears in the above-identified patent and that said Letters Patent is hereby corrected as shown below:

Column 1
Line 37, insert -- , -- following "atoms".
Line 51, delete "—$CF_2CF_2CF_2$—" and insert -- —$CF_2CF_2CH_2$— -- in place thereof.
Line 53, delete "." following "2" and insert -- , -- in place thereof.

Column 4
Line 9, below "thereof." insert -- As used herein, primary and secondary amino groups do not include amide groups. -- (As a new paragraph).

Column 6
Line 16, delete "$(CH_2CH_2NH)_3$ H" and insert -- $(CH_2CH_2NH)_3H$ -- in place thereof.
Line 17, delete "$(CH_2CH_2NH)_3$ H" and insert -- $(CH_2CH_2NH)_3H$ -- in place thereof.

Column 9
Line 50, delete "$1791-1$" and insert -- $1791^{-1}$ -- in place thereof.

Signed and Sealed this

Twenty-seventh Day of May, 2008

JON W. DUDAS
*Director of the United States Patent and Trademark Office*